(12) United States Patent (10) Patent No.: US 12,615,007 B1
Liu et al. (45) Date of Patent: Apr. 28, 2026

(54) ROADSIDE PHOTOVOLTAIC SITE SELECTION METHOD CONSIDERING GLARE IMPACT

(71) Applicant: CCCC SECOND HIGHWAY CONSULTANTS CO., LTD., Wuhan (CN)

(72) Inventors: Gang Liu, Wuhan (CN); Zhongsheng Yang, Wuhan (CN); Jingbo Zhang, Wuhan (CN); Shunxin Yu, Wuhan (CN); Ming Yang, Wuhan (CN); Meng Yu, Wuhan (CN); Zhuozhi Li, Wuhan (CN); Jing Luo, Wuhan (CN); Chulong Chen, Wuhan (CN)

(73) Assignee: CCCC SECOND HIGHWAY CONSULTANTS CO., LTD., Wuhan (CN)

( * ) Notice: Subject to any disclaimer, the term of this patent is extended or adjusted under 35 U.S.C. 154(b) by 0 days.

(21) Appl. No.: 19/004,504

(22) Filed: Dec. 30, 2024

Related U.S. Application Data

(63) Continuation of application No. PCT/CN2024/088429, filed on Apr. 17, 2024.

(30) Foreign Application Priority Data

May 16, 2023 (CN) .......................... 202310552680.7

(51) Int. Cl.
H02S 20/32 (2014.01)
G01C 15/00 (2006.01)
(Continued)

(52) U.S. Cl.
CPC .............. H02S 20/32 (2014.12); G01C 15/00 (2013.01); G01J 1/44 (2013.01); H02S 20/10 (2014.12);
(Continued)

(58) Field of Classification Search
CPC ......... H02S 20/32; H02S 20/10; G01C 15/00; G01J 1/44; G01J 2001/4266; F03D 9/007;
(Continued)

(56) References Cited

U.S. PATENT DOCUMENTS

| | | | |
|---|---|---|---|
| 8,841,592 B1 | 9/2014 | Ho et al. | |
| 2012/0206050 A1* | 8/2012 | Spero | F21S 4/28 |
| | | | 315/152 |
| 2021/0080319 A1* | 3/2021 | Brown | G01J 5/0846 |

FOREIGN PATENT DOCUMENTS

| | | |
|---|---|---|
| CN | 106372346 A | 2/2017 |
| CN | 114580211 A | 6/2022 |

(Continued)

OTHER PUBLICATIONS

Zhu, Haipeng and Zongchao, Gu—"A Method of Estimating the Spatiotemporal Distribution of Reflected Sunlight from Glass Curtain Walls in High-rise Business Districts using Street-view Panoramas"; Sustainable Cities and Society, vol. 79, 2022, 103671, https://doi.org/10.1016/j.scs.2022.103671. (Year: 2022).*

(Continued)

*Primary Examiner* — Arleen M Vazquez
*Assistant Examiner* — Leonard S Liang
(74) *Attorney, Agent, or Firm* — Bayramoglu Law Offices LLC

(57) ABSTRACT

A roadside photovoltaic site selection method considering glare impact includes: obtaining latitudes, longitudes, ground elevations, and contour vertex eights of photovoltaic modules above ground of a photovoltaic array; calculating a sun movement path, determining an installation manner based on predicted solar radiation on inclined surfaces of the photovoltaic array; calculating an elevation angle and an azimuth angle of each reflected light caused by the inclined surfaces; arranging observation points and conducting a glare impact analysis for each observation point; determining whether to adjust an installation tilt angle of each photovoltaic module or distances between adjacent photovoltaic modules; comparing solar radiation received on the inclined surfaces between the critical tilt angle and the optimal tilt angle; in response to a difference in the solar (Continued)

radiation less than a set value, accepting the critical tilt angle; and completing the glare impact analysis for each observation point, and providing recommended installation locations.

4 Claims, 4 Drawing Sheets

(51) Int. Cl.

| | |
|---|---|
| *G01J 1/44* | (2006.01) |
| *H02S 20/10* | (2014.01) |
| *F03D 9/00* | (2016.01) |
| *G01J 1/42* | (2006.01) |
| *G06Q 10/0639* | (2023.01) |
| *H02J 7/35* | (2006.01) |

(52) U.S. Cl.
CPC ....... *F03D 9/007* (2013.01); *G01J 2001/4266* (2013.01); *G06Q 10/06393* (2013.01); *H02J 7/35* (2013.01); *Y02B 20/72* (2013.01); *Y02E 10/50* (2013.01); *Y02T 10/70* (2013.01)

(58) Field of Classification Search
CPC ..... G06Q 10/06393; H02J 7/35; Y02B 20/72; Y02E 10/50; Y02T 10/70
See application file for complete search history.

(56) References Cited

FOREIGN PATENT DOCUMENTS

| | | |
|---|---|---|
| CN | 116452066 A | 7/2023 |
| KR | 20120039296 A | 4/2012 |
| KR | 101940313 B1 | 1/2019 |

OTHER PUBLICATIONS

Sreenath, S.; Sudhakar, K.; Yusop, A.F.; Cuce, Erdem; and Solomin, Evgeny—"Analysis of solar PV glare in airport environment: Potential Solutions"; Results in Engineering 5 (2020) 100079. (Year: 2020).*

Wang, Hao (Ph.D.); Guo, Lukai (Ph.D.); and Soares, Laura—Energy Harvesting on New Jersey Roadways Final Report; In cooperation with New Jersey Department of Transportation Bureau of Research and U.S. Department of Transportation Federal Highway Administration; Jan. 2023. (Year: 2023).*

Rascon, Danyela Samaniego; Ferreira, Almerindo D.; Gameiro da Silva, Manuel C.; Iriarte, Guitlahuac—"Ocular risks assessment in a central receiver solar power facility based on measured data of direct solar radiation"; Solar Energy 164 (2018) 77-88. (Year: 2018).*

Paudel, Ananda (Dr.); Hirsch, Arthur—"Potential Impacts of Solar Arrays on Highway Environment, Safety and Operations"; Colorado Department of Transportation Applied Research and Innovation Branch; Report No. CDOT-2015-08; Oct. 2015. (Year: 2015).*

Ho, Clifford K.—"Relieving a Glaring Problem"; Solar Today; pp. 28-31 (Apr. 2013). (Year: 2013).*

Kim, Soullam; Lee, Yuhwa; and Moon, Hak-Ryong—"Siting criteria and feasibility analysis for PV power generation projects using road facilities"; Renewable and Sustainable Energy Reviews 81 (2018) 3061-3069. (Year: 2018).*

Sreenath, S.; Sudhakar, K.; and Yusop, A.F.—"Solar PV in the airport environment: A review of glare assessment approaches & metrics"; Solar Energy 216 (2021) 439-451. (Year: 2021).*

Danks, Ryan; Good, Joel—"Urban Scale Simulations of Solar Reflections in the Built Environment: Methodology & Validation"; SimAUD May 16-18, 2016 London, UK. (Year: 2016).*

Goswami, Ishangiri—"Analysis of Solar PV Glare in the Urban Environment"; Master Thesis to obtain the degree of Master of Science at the Delft University of Technology, to be defended publicly on Monday Nov. 30, 2022. (Year: 2022).*

* cited by examiner

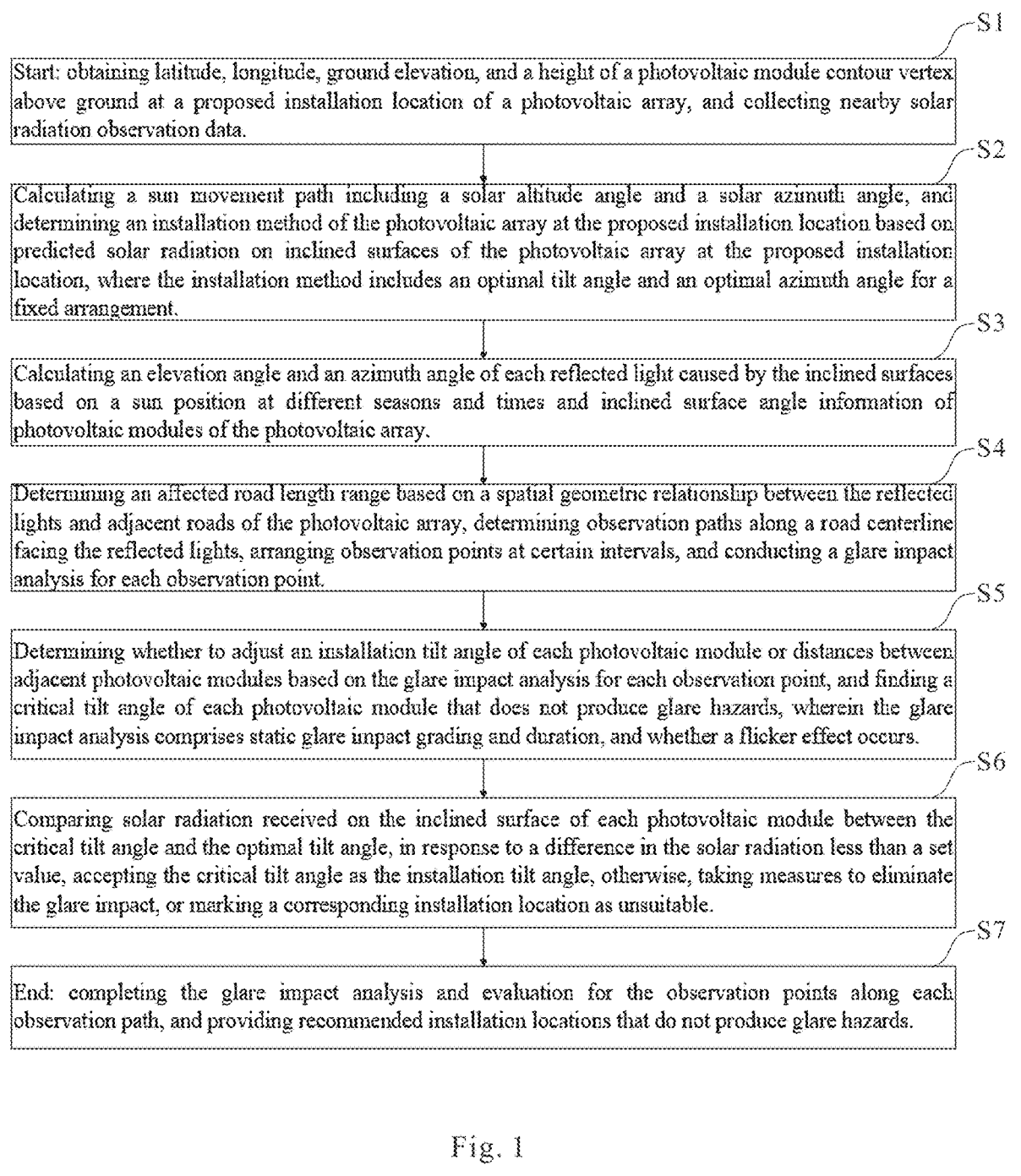

S1

Start: obtaining latitude, longitude, ground elevation, and a height of a photovoltaic module contour vertex above ground at a proposed installation location of a photovoltaic array, and collecting nearby solar radiation observation data.

S2

Calculating a sun movement path including a solar altitude angle and a solar azimuth angle, and determining an installation method of the photovoltaic array at the proposed installation location based on predicted solar radiation on inclined surfaces of the photovoltaic array at the proposed installation location, where the installation method includes an optimal tilt angle and an optimal azimuth angle for a fixed arrangement.

S3

Calculating an elevation angle and an azimuth angle of each reflected light caused by the inclined surfaces based on a sun position at different seasons and times and inclined surface angle information of photovoltaic modules of the photovoltaic array.

S4

Determining an affected road length range based on a spatial geometric relationship between the reflected lights and adjacent roads of the photovoltaic array, determining observation paths along a road centerline facing the reflected lights, arranging observation points at certain intervals, and conducting a glare impact analysis for each observation point.

S5

Determining whether to adjust an installation tilt angle of each photovoltaic module or distances between adjacent photovoltaic modules based on the glare impact analysis for each observation point, and finding a critical tilt angle of each photovoltaic module that does not produce glare hazards, wherein the glare impact analysis comprises static glare impact grading and duration, and whether a flicker effect occurs.

S6

Comparing solar radiation received on the inclined surface of each photovoltaic module between the critical tilt angle and the optimal tilt angle, in response to a difference in the solar radiation less than a set value, accepting the critical tilt angle as the installation tilt angle, otherwise, taking measures to eliminate the glare impact, or marking a corresponding installation location as unsuitable.

S7

End: completing the glare impact analysis and evaluation for the observation points along each observation path, and providing recommended installation locations that do not produce glare hazards.

Fig. 1

ROADSIDE PHOTOVOLTAIC SITE SELECTION METHOD CONSIDERING GLARE IMPACT

CROSS REFERENCE TO THE RELATED APPLICATIONS

This application is a continuation application of International Application No. PCT/CN2024/088429, filed on Apr. 17, 2024, which is based upon and claims priority to Chinese Patent Application No. 202310552680.7, filed on May 16, 2023, the entire contents of which are incorporated herein by reference.

TECHNICAL FIELD

The disclosure relates to the field of technology that integrates highway traffic with solar photovoltaic power generation, and more particularly to a roadside photovoltaic site selection method considering glare impact.

BACKGROUND

Currently in the field of road traffic, photovoltaic power generation is mostly applied in service areas, median strips, roadside slopes, and tunnel entrances and exits. During a planning phase of a road photovoltaic power generation project, it is necessary to choose suitable locations for installing solar photovoltaic arrays based on solar energy resource conditions of the region where the project is located. Solar photovoltaic modules generally include tempered glass with good light transmission on the front cover to protect the solar cells. This structure can produce significant glare when illuminated by external light sources, causing light pollution to the surrounding environment and potential adverse effects on traffic safety. Even with the use of anti-reflective coatings (anti-reflection films), this impact cannot be directly eliminated. It is necessary to consider the glare impact brought by photovoltaics when selecting a photovoltaic power station site.

Photovoltaic modules installed on the roadside, especially on a straight section of the roadside, may form a series of reflective light sources with certain spacing under sunlight. Due to the visual persistence effect of human eyes, when the light sources move rapidly relative to the human eyes, an object image will be retained on a driver's retina and transmitted to the cerebral cortex through the visual nerve to form a visual image, and the visual image will persist for about 0.1 seconds after the light source disappears. When the light sources are visible within the driver's field of vision during driving, if the installed spacing of the photovoltaic modules results in a flicker frequency (also referred to as flash frequency or stroboscopic frequency) of the reflected light source relative to the driving speed between 2.5 Hertz (Hz) and 15 Hz, it will cause a high-brightness light source to rapidly form an image on the human retina and then disappear. This flicker effect (also referred to as stroboscopic effect) produces glare that does not reduce visual performance and visibility, but belongs to discomfort glare, which can trigger short-term emotional responses such as irritability, tension, and anxiety in the driver, thereby affecting driving safety.

SUMMARY

In response to glare impact of photovoltaic power generation that may cause in road scenarios, a purpose of the disclosure is to provide a roadside photovoltaic site selection method considering the glare impact. The roadside photovoltaic site selection method conducts a comprehensive analysis of the glare impact during a siting stage, theoretically identifying all installation sites that generate adverse glare effects, and provides beneficial reference for a siting design of roadside photovoltaic projects in a planning stage.

In order to achieve above purpose, the disclosure adopts below technical solutions.

The roadside photovoltaic site selection method considering the glare impact achieves an identification of glare hazard impact during the planning stage of roadside photovoltaic installation. A content of the identification includes a range, duration, and degree of the glare impact. The roadside photovoltaic site selection method specifically includes the following steps S1-S7:

S1, obtaining a spatial position coordinate (a latitude, a longitude and a ground elevation) of a contour vertex of each photovoltaic module based on a proposed installation location and an installation manner of a photovoltaic array, calculating and analyzing a daily sun movement path based on the latitude, the longitude and a time zone of the proposed installation location of the photovoltaic array, and obtaining measured time-series data such as total radiation, direct radiation, diffuse radiation and maximum irradiance from a local or nearby reference meteorological station; where the daily sun movement path includes a solar altitude angle and a solar azimuth angle;

S2, in response to a fixed arrangement as the installation manner, calculating an optimal tilt angle and an optimal azimuth angle based on monthly average irradiance, direct component irradiance and diffuse component irradiance; where the optimal tilt angle and the optimal azimuth angle include an annual optimal tilt angle and an annual optimal azimuth angle, a quarterly optimal tilt angle and a quarterly optimal azimuth angle, and a monthly optimal tilt angle and a monthly optimal azimuth angle; where in response to a grid-connected photovoltaic power generation system, the optimal tilt angle should maximize annual radiation on inclined surfaces of the photovoltaic array; in response to a stand-alone photovoltaic power generation system, the optimal tilt angle should ensure a larger radiation on the inclined surfaces during a month with lowest irradiance;

calculating an elevation angle and an azimuth angle of each reflected light at different months and times based on the optimal tilt angle and the optimal azimuth angle of the photovoltaic array;

in response to a tracking arrangement as the installation manner, calculating the azimuth angle of each reflected light based on a tracking angle change range of different tracking systems such as single-axis tracking and dual-axis tracking (in this case, an incidence angle is 0 degree, and the elevation angle of each reflected light is equal to a solar altitude angle);

S3, calculating static glare: in a range of the reflected lights calculated in the step S2, analyzing a spatial position relationship between a spatial coverage of the azimuth angle and the elevation angle of each reflected light and adjacent roads, arranging observation points at certain distances within affected road sections, obtaining one or more observation paths based on road position and traffic direction, calculating the glare impact (including retinal irradiance and an angle corresponding to a glare source) on a driver at different observation points on different observation paths, analyzing intensity changes and duration of glare from photovoltaic panels (inclined surfaces) of the photovoltaic modules that the driver can feel during different times from sunrise to sunset in different seasons at different observation points, traversing the observation points on a current observation path, followed by calculating the observation points on a next observation path, until calculations of the glare impact at all the observation points of all observation paths are completed, and analyzing a spatiotemporal distribution of the glare along the observation paths based on a static glare evaluation method;

where the static glare evaluation method includes: calculating glare evaluation metrics and determining a degree of the glare impact based on values of the glare evaluation metrics;

S4, calculating dynamic glare: analyzing a flicker effect under different driving speeds and different photovoltaic module installation spacing scenarios along each observation path with the glare impact, calculating whether the driver experiences the flicker effect when the driving speed is between minimum and maximum speed limits of the road according to dynamic human visual characteristics, i.e., a view field of the driver will gradually narrow as the driving speed increases during driving;

S5, determining whether to adjust an installation tilt angle of each photovoltaic module or distances between adjacent photovoltaic modules based on results of glare impact analysis for each observation point, and finding a critical tilt angle of each photovoltaic module that does not produce glare hazards, where the results of the glare impact analysis include static glare impact grading and the duration, and whether the flicker effect occurs;

S6, comparing solar radiation received on the inclined surfaces of the photovoltaic modules at the critical tilt angle and the optimal tilt angle; in response to a difference in the solar radiation less than a set value (e.g., 5%), accepting the critical tilt angle as the installation tilt angle; in response to a difference in the solar radiation greater than or equal to a set value, taking measures to eliminate the glare impact or marking a corresponding installation location as unsuitable; and S7, completing the glare impact analysis and evaluation for all the observation points along each observation path, and providing recommended installation locations that do not produce glare hazards.

In an embodiment, the observation paths include any road on which the photovoltaic array is capable of being observed in a travel direction, or a building group in a roadside service area. A preliminary judgment can be made on roads or buildings that may be affected, by analyzing a geometric relationship between the proposed installation location of the photovoltaic array and a road network.

In an embodiment, the observation points are set according to the following principles: along a road travel direction, a view height of 1.2 meters (m) (taking a sedan as an example) or 2.4 m (taking a truck as an example), and whether the photovoltaic array can be observed within the view field of the driver. In response to a point on which the photovoltaic array is capable of being observed within the view field of the driver, the point is marked as an observation point and numbered, with no restriction on distances between adjacent observation points; and in response to the photovoltaic array being not visible within the view field due to obstruction by obstacles, there is no need to set an observation point. The distance between adjacent two observation points on a straight road section can be increased due to a fixed direction of the straight road section, and the distance between adjacent two observation points on a curved road section can be decreased.

In an embodiment, in response to the fixed arrangement, when a bracket tilt angle on the curved road section is equal to the monthly optimal tilt angle $\beta_{opt}$ of each photovoltaic module, and an azimuth angle $\Phi$ of each photovoltaic module is equal to a bracket azimuth angle and consistent with an azimuth angle of a slope surface or a road centerline of the curved road section, the solar altitude angle is denoted as $\alpha$, the solar azimuth angle is denoted as $\theta$, the installation tilt angle of each photovoltaic module is denoted as $\beta$, and the azimuth angle of each photovoltaic module is denoted as $\Phi$, and a direction unit vector of each reflected light is $\vec{q}=[q_x, q_y, q_z]^T$, calculated according to an equation (15):

$$\vec{q}=M^T\times\vec{b} \tag{15};$$

where $M^T$ represents a transpose matrix of a matrix M, and expressions for the matrix M and a vector $\vec{b}$ are as follows:

$$M = \begin{bmatrix} 0 & -n_z & n_y \\ n_z & 0 & -n_x \\ -n_y & n_x & 0 \\ n_x & n_y & n_z \end{bmatrix};$$

$$\vec{b} = \begin{bmatrix} -n_z k_y + n_y k_z \\ n_z k_x - n_x k_z \\ -n_y k_x + n_x k_y \\ -(n_x k_x + n_y k_y + n_z k_z) \end{bmatrix};$$

where $\vec{n}=[n_x, n_y, n_z]$ represents an outward normal unit vector of the inclined surfaces of each photovoltaic module, $\vec{k}=[k_x, k_y, k_z]$ represents a direction unit vector of an incident light, and component expressions of $\vec{n}$ and $\vec{k}$ are as follows:

$n_x=\sin\beta\sin\Phi$;

$n_y=\sin\beta\cos\Phi$;

$n_z=\cos\beta$;

$k_x=\cos(-\alpha)\cos(270°-\theta)$;

$k_y=\cos(-\alpha)\sin(270°-\theta)$;

$k_z=\sin(-\alpha)$;

After obtaining the direction unit vector of each reflected light $\vec{q}=[q_x, q_y, q_z]^T$, the elevation angle $\eta$ and the azimuth angle $\psi$ of each reflected light are obtained by converting the direction unit vector of each reflected light from Cartesian vector to horizontal coordinates, as follows:

$\eta=\arcsin(q_z)$;

$$\psi = \arctan\left(\frac{q_x}{q_y}\right);$$

an impact range of the reflected lights is determined after calculating directions of the reflected lights.

Compared to the related art, the disclosure has the following beneficial effects.

(1) The disclosure can guide a design process, avoiding potential safety hazards caused by neglecting the glare or insufficient consideration in early stages.

(2) By introducing the analysis of static and dynamic glare, it is possible to consider the glare impact on objects such as personnel inside buildings and vehicle drivers within the influence range of a photovoltaic power generation system, thereby comprehensively evaluating environmental impact of roadside photovoltaic installations.

(3) There is no need for on-site field tests during a planning phase. Theoretical calculations based on publicly available topographical information and road network data can determine and effectively evaluate the glare impact of roadside photovoltaics.

(4) The roadside photovoltaic site selection method provides siting guidance for installing distributed photovoltaic power generation systems on the curved road section, thereby improving a utilization rate of idle land.

BRIEF DESCRIPTION OF THE DRAWINGS

FIG. 1 illustrates a flowchart of a roadside photovoltaic site selection method considering glare impact.

DETAILED DESCRIPTION OF THE EMBODIMENTS

Figure 2:
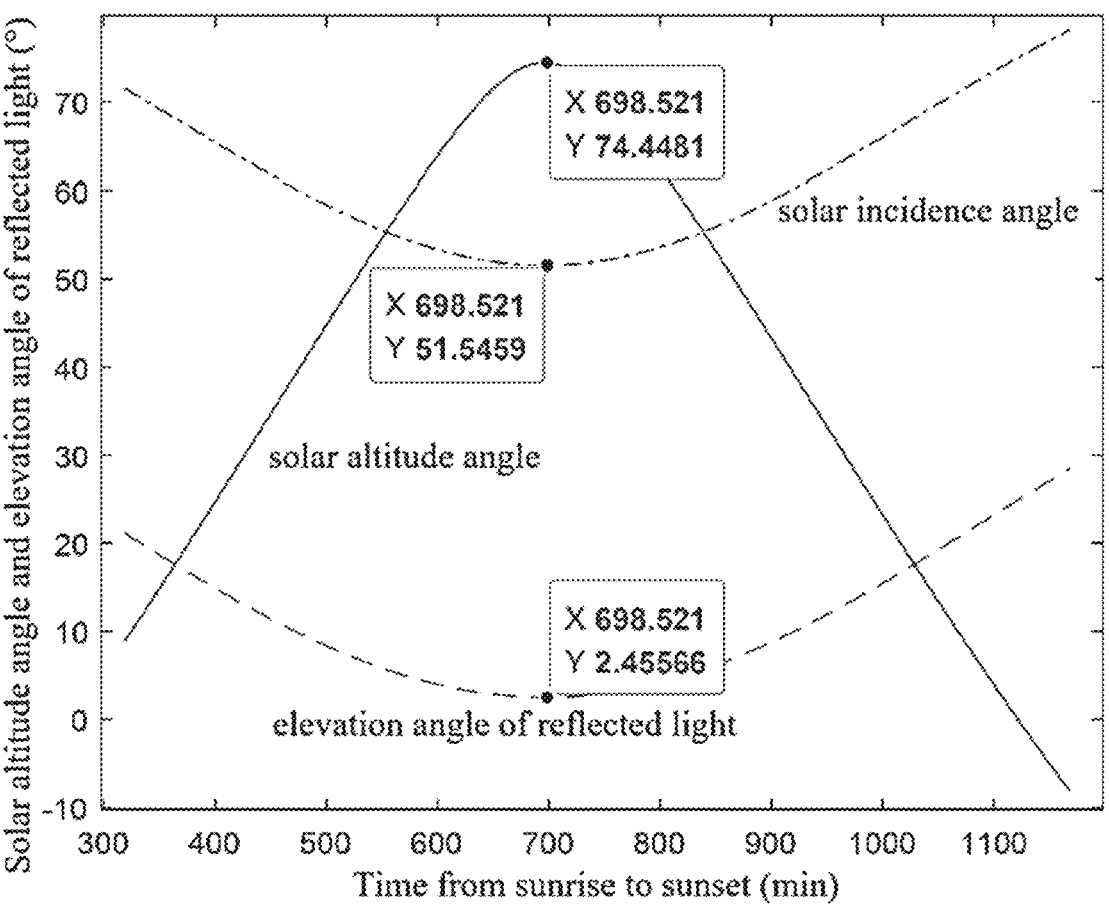
FIG. 2 illustrates a change trend diagram of a solar altitude angle, a solar incidence angle, and an elevation angle of a reflected light from a photovoltaic module during a period from sunrise to sunset.

The disclosure is further explained in conjunction with the accompanying drawings and specific embodiments. It should be understood that these embodiments are only used to illustrate the disclosure and not to limit the scope of the disclosure. In addition, it should be understood that after reading the content taught in the disclosure, those skilled in the art can make various modifications or amendments to the disclosure, and these equivalent forms also fall within the scope of the disclosure.

A roadside photovoltaic site selection method considering glare impact, as shown in FIG. 1, includes the following steps S100-S500.

S100, solar radiation received on each inclined surface with any tilt angle and any azimuth angle is estimated based on geographical location information of a roadside photovoltaic project to be installed, to determine an installation manner of distributed photovoltaics. In the embodiment, a fixed arrangement is used for installation as an example.

A theoretical value of extraterrestrial horizontal solar radiation (also known as astronomical radiation) is calculated as follows:

$$G_{exH} = G_0\left(1 + 0.0333\cos\left(\frac{360N}{365}\right)\right)(\sin\varphi\sin\delta + \cos\varphi\cos\delta\cos\omega_h); \quad (1)$$

where $G_{exH}$ is the extraterrestrial solar radiation on a horizontal surface located in a specific location, in watts per square meter (W/m$^2$), $G_0$ is the solar constant, typically taken as 1367 W/m$^2$, N is the day number defined as the number of days elapsed in a given year up to a particular date (e.g., the 1st of January corresponds to N=1), indicating a sequence number of a date in a year, with a difference of one day between a common year and a leap year, $\varphi$ is latitude, $\delta$ is the angle of declination and $\omega_h$ is the hour angle, and $\alpha$ represents a solar altitude angle.

Considering a period from sunrise to sunset, the equation (1) is integrated to obtain a daily extraterrestrial horizontal solar radiation (in kilowatts per square meter, kWh/m$^2$) as follows:

$$E_{exH} = \frac{24}{\pi \times 1000}G_0\left(1 + 0.0333\cos\left(\frac{360N}{365}\right)\right)\left(\cos\varphi\cos\delta\sin\omega_h + \frac{h}{180}\omega_h\sin\varphi\sin\delta\right)$$

(2);

A ratio of global solar radiation or called terrestrial solar radiation ($G_T$) reaching a surface level on the horizontal plane after passing through the atmosphere to the extraterrestrial solar radiation ($G_{exH}$) is called a clearness index $K_T$, which can be calculated according to actual observation data. An empirical relationship is established between a ratio of direct horizontal radiation to total horizontal radiation ($G_B/G_T$) and the clearness index $K_T$.

The direct solar radiation ($G_B$) received on the horizontal plane is calculated by an American society of heating, refrigerating and air-conditioning engineers (ASHRAE) clear sky model, as follows:

$$G_B = G_{B-norm} = G_{B-norm}\sin\alpha \quad (3);$$

$$G_{B-norm} = \left\{1160 + 75\sin\left[\frac{360}{365}(N - 275)\right]\right\} \quad (4)$$

$$\exp\left\{-\frac{0.174 + 0.035\sin\left[\frac{360}{365}(N - 100)\right]}{\sin\alpha}\right\};$$

The solar altitude angle $\alpha$ is obtained by taking the inverse sine (arcsine) of the following equation:

$$\sin\alpha = \sin\varphi\sin\delta + \cos\varphi\cos\delta\cos\omega_h \quad (5);$$

The solar azimuth angle $\theta$ is obtained by taking the inverse cosine (arccosine) of the following equation. The direction of the solar azimuth angle is defined here as: positive when turning clockwise from due north, with due north being 0 degree, due east being 90 degrees, due south being 180 degrees, and due west being 270 degrees.

$$\cos\theta = \frac{\sin\delta\cos\varphi - \cos\delta\sin\varphi\cos\omega_h}{\cos\alpha}; \quad (6)$$

When the solar hour angle is greater than 0, a diffuse radiation $G_D$ received on the horizontal plane is calculated as follows:

$$G_D = G_{B-norm}\left\{0.095 + 0.04\sin\left[\frac{360}{365}(N - 100)\right]\right\}; \quad (7)$$

The total solar radiation $G_{T\text{-}\beta}$ on each inclined surface of the photovoltaic modules is the sum of direct radiation $G_{B\text{-}\beta}$ on each inclined surface, diffuse radiation $G_{D\text{-}\beta}$ on each inclined surface, and ground-reflected radiation $G_R$. The total solar radiation $G_{T\text{-}\beta}$ is calculated as follows:

$$G_{T\text{-}\beta}=G_{B\text{-}\beta}+G_{D\text{-}\beta}+G_R=G_B R_B+G_D R_D+\rho G_T R_R \tag{8}$$

$$R_B = \frac{\cos(\varphi-\beta)\cos\delta\sin\omega_t + \frac{\pi}{180}\omega_t\sin(\varphi-\beta)\sin\delta}{\cos\varphi\cos\delta\sin\omega_h + \frac{\pi}{180}\omega_h\sin\varphi\sin\delta} ; \tag{9}$$

$$\omega_h=\cos^{-1}(-\tan\varphi\tan\delta) \tag{10}$$

$$\omega_t=\min\{\omega_h,\cos^{-1}(+\tan(\varphi-\beta)\tan\delta)\} \tag{11}$$

$$R_D = \frac{G_B}{G_T}R_B + \frac{\left(1-\frac{G_B}{G_T}\right)(1+\cos\beta)}{2} ; \tag{12}$$

$$R_R = \frac{1-\cos\beta}{2} ; \tag{13}$$

where $R_B$ represents a ratio of the direct radiation on each inclined surface to the direct horizontal radiation, $R_D$ represents a ratio of the diffuse solar radiation on each inclined surface to the diffuse radiation on the horizontal plane, $R_R$ represents a correction factor for the reflected radiation on each inclined surface, $\beta$ represents an angle between each inclined surface and the horizontal plane, $\omega_t$ represents a sunset hour angle corresponding to each inclined surface, $\rho$ represents a ground reflectance, typically taken as 0.2, and $G_T$ represents the total horizontal radiation, which is a sum of the direct horizontal radiation and the diffuse radiation on each inclined surface, i.e., $G_T=G_B+G_D$.

Daily radiation, as well as the monthly and annual solar radiation, on each inclined surface of the photovoltaic modules can be calculated by above methods.

If more accurate monthly average daily radiation is required, it is generally obtained by calculating the ratio of total horizontal radiation to the astronomical radiation, i.e., the clearness index $K_T$ (ranging from 0 to 1), according to actual observed daily radiation (obtained from solar radiation observation stations or public databases with historical data), and establishing a relationship formula between the clearness index and sunshine percentage, ambient temperature, and humidity, to predict solar radiation for the design life. The ratio of the direct horizontal radiation to the total horizontal radiation ($G_B/G_T$) can also be related to the clearness index $K_T$, for example, as shown in an equation (14) below:

$$\frac{G_B}{G_T} = \begin{cases} 0.952, & \text{if } K_T \le 0.13 \\ 0.868 + 1.335K_T - 5.782K_T^2 + 3.721K_T^3, & \text{if } 0.13 < K_T \le 0.80 \\ 0.141, & \text{if } K_T > 0.80 \end{cases} \tag{14}$$

After obtaining the monthly and annual solar radiation, by plotting a relationship between radiation and tilt and azimuth angles, a monthly optimal tilt angle, a monthly optimal azimuth angle, an annual optimal tilt angle and an annual optimal azimuth angle can be determined. In the embodiment, the monthly optimal tilt angle and the monthly optimal azimuth angle (denoted as $\beta_{opt}$ and $\Phi_{opt}$ respectively) are used as an example.

S200, without loss of generality, it should be considered that the photovoltaic modules and their mounting brackets may have different azimuth angles and tilt angles. To obtain horizontal coordinates of an outward normal vector of each photovoltaic module relative to an inclined surface on which a bracket is located, it is necessary to transform the outward normal vector from the inclined surface coordinate system of the bracket to the horizontal surface coordinate system. To avoid affecting the subsequent explanation and a simplification is made here, it is assumed that a bracket tilt angle on a curved road section is equal to the monthly optimal tilt angle $\beta_{opt}$ of each photovoltaic module, an azimuth angle $\Phi$ of each photovoltaic module is equal to a bracket azimuth angle and consistent with an azimuth angle of a slope surface or a road centerline of the curved road section (the azimuth angle is defined as: positive when turning clockwise from due north, with due north being 0 degree, due east being 90 degrees, due south being 180 degrees, and due west being 270 degrees), the solar altitude angle is denoted as $\alpha$, the solar azimuth angle is denoted as $\theta$, an installation tilt angle of each photovoltaic module is denoted as $\beta$, and the azimuth angle of each photovoltaic module is denoted as $\Phi$, and a direction unit vector of each reflected light is $\vec{q}=[q_x, q_y, q_z]^T$, calculated according to an equation (15):

$$\vec{q}=M^T\times\vec{b} \tag{15}$$

where $M^T$ represents a transpose matrix of a matrix M, and expressions for the matrix M and a vector $\vec{b}$ are as follows:

$$M = \begin{bmatrix} 0 & -n_z & n_y \\ n_z & 0 & -n_x \\ -n_y & n_x & 0 \\ n_x & n_y & z \end{bmatrix};$$

$$\vec{b} = \begin{bmatrix} -n_z k_y + n_y k_z \\ n_z k_x - n_x k_z \\ -n_y k_x + n_x k_y \\ -(n_x k_x + n_y k_y + n_z k_z) \end{bmatrix};$$

where $\vec{n}=[n_x, n_y, n_z]$ represents an outward normal unit vector of the inclined surfaces of each photovoltaic module, $\hat{k}=[k_x, k_y, k_z]$ represents a direction unit vector of an incident light, and component expressions of $\vec{n}$ and $\vec{k}$ are as follows:

$$n_x=\sin\beta\sin\Phi;$$

$$n_y=\sin\beta\cos\Phi;$$

$$n_z=\cos\beta;$$

$$k_x=\cos(-\alpha)\cos(270°-\theta);$$

$$k_y=\cos(-\alpha)\sin(270°-\theta);$$

$$k_z=\sin(-\alpha);$$

after obtaining the direction unit vector of each reflected light $\vec{q}=[q_x, q_y, q_z]^T$, the elevation angle $\eta$ and the azimuth angle $\psi$ of each reflected light are obtained by converting the direction unit vector of each reflected light from Cartesian vector to horizontal coordinates, as follows:

$$\eta = \arcsin(q_z) \tag{16}$$

$$\psi = \arctan\left(\frac{q_x}{q_y}\right); \tag{17}$$

an impact range of the reflected lights is determined after calculating directions of the reflected lights.

S300, a general occurrence condition of indirect glare is that an angle (acute angle) between each reflected light (the disclosure does not consider direct glare caused by direct sunlight, but a calculation principle is the same) and a travel direction of a vehicle is less than a view field angle of a driver. The view field angle of the driver is determined by horizontal and vertical view fields, and the direction of a sight line of the driver is considered to be consistent with the road centerline of the traffic lane, i.e., an azimuth angle and slope of the sight line of the driver are kept the same as the road centerline of the traffic lane. In a stationary state, the horizontal view field of a normal person's eyes is about 120 degrees, and the vertical view field is about 120 degrees. Considering a dynamic state of the driver, with the sight line of the driver as a center, the horizontal view field can be taken as 60 degrees, and the vertical view field can be taken as 50 degrees. The most favorable condition for glare to occur is: the angle between each reflected light and the centerline of the traffic lane (i.e., an absolute value of the difference between the azimuth angle of each reflected light and the azimuth angle of the centerline of the traffic lane) is less than half of the horizontal view field, and at the same time, the angle between each reflected light and a longitudinal direction of the road (i.e., the absolute value of the difference between the elevation angle of each reflected light and the slope of the centerline of the traffic lane) is less than half of the vertical view field. If the angle between a glare source and the sight line exceeds 50 degrees, the glare impact can be neglected.

The elevation and azimuth angles of the reflected lights from each photovoltaic module in the photovoltaic array can be calculated according to the step S200. Road areas affected by indirect glare can be determined by considering the general and favorable conditions for glare occurrence.

S400, observation paths $PA_i$ (i∈ N, N represents a positive integer set) are selected, and observation points $OP_j$ (j∈ N, N represents a positive integer set) are arranged at certain intervals, based on the road areas affected by the indirect glare determined in the step S300. Calculations are performed according to established quantitative indicators for glare evaluation, considering different seasons and different times from sunrise to sunset (or more accurately, sunrise and sunset times corresponding to different tilt and azimuth angles of the photovoltaic modules). The quantitative indicators for the glare evaluation are explained below.

The glare includes disabling glare and discomfort glare. In the field of road lighting, a threshold increment (TI) and a glare rating (GR) are mainly used for evaluation. The "disabling glare" refers to "glare that reduces the visibility of visual objects but does not necessarily cause discomfort". When there is no glare source, the imaging of objects within the view field focuses on the retina, and a visual perception is determined by the brightness of the objects. When a glare source is present, the light emitted by the glare source scatters to form a light curtain that overlays on the retina.

The impact of the light curtain is equivalent to brightness known as equivalent veiling luminance. When the equivalent veiling luminance is low, the contrast between the objects and their environment in the human eye is reduced, affecting the speed of visual response thereby causing hazards.

The equivalent veiling luminance can be calculated as follows:

$$L_v = K\frac{E_{eye}}{\theta^m}; \tag{18}$$

where $L_v$ represents the equivalent veiling luminance (unit: cd/m², candelas per square meter); K represents a proportionality constant, and when $\Phi$ is in degrees, K=10; $E_{eye}$ represents an illuminance of the glare source perpendicular to the sight line (unit: lux abbreviated as lx); $\theta$ represents an angle between an incident light of the glare source and the sight line, for motor vehicle traffic road glare limitation calculations, the international commission on illumination (CIE) recommends a value of 20 degrees; and m represents an optical construction constant of human eyes when $\theta<2°$, m=2.3–0.7 lg$\theta$, and when $\theta\geq2°$, m=2.

To counteract the impact of the equivalent veiling luminance on vision and restore the contrast between the objects and their environment in the human eyes, it is necessary to increase the brightness of the objects. This increase in the brightness is called the TI. The TI can be calculated using the following formula:

$$TI = 65\frac{L_v}{L_{av}^{0.9}}; \tag{19}$$

where $L_v$ represents the equivalent veiling luminance, $L_{av}$ represents an average luminance of the road surface, which typically ranges from 0.05 cd/m² to 5 cd/m². The GR is calculated as follows:

$$GR = 27 + 24lg\frac{L_{vp}}{L_{ve}^{0.8}}; \tag{20}$$

where $L_{vp}$ represents luminance of the light curtain produced by the glare source and Lve represents luminance of a light curtain produced by the ambient light. A calculation formula of the glare control level (GF) is as follows:

$$GF=10-GR/10 \tag{21};$$

The relationship between the GR, glare control level (glare factor, GF), and human subjective perception is shown in the table 1:

TABLE 1

| Glare classification description based on the GR and the GF. | | |
|---|---|---|
| GR | GF | Subjective Perception Description |
| 90 | 1 | Unbearable |
| 80 | 2 | Unbearable |
| 70 | 3 | Annoying |
| 60 | 4 | Annoying |
| 50 | 5 | Barely tolerable |

TABLE 1-continued

| Glare classification description based on the GR and the GF. | | |
| --- | --- | --- |
| GR | GF | Subjective Perception Description |
| 40 | 6 | Barely tolerable |
| 30 | 7 | Noticeable |
| 20 | 8 | Noticeable |
| 10 | 9 | Unnoticeable |

In addition to using the brightness of the light source and the background as variables to calculate glare metrics, the illuminance can also be used to characterize the degree of the discomfort glare.

According to relevant literature, a value of a "psychological glare degree index" G can be calculated using the following equation:

$$G=\log(E_r \times L^{2.5}/10^5) \qquad (22);$$

where $E_r$ represents the illuminance of the glare source on the eye (unit: lx), when G is in a range of 0 to 2, it does not cause psychological discomfort; and when G>2, it indicates the presence of psychologically discomfortable glare. L represents a distance from the glare source to the human eyes. The illuminance is a measure of the luminous flux from natural or artificial light sources per unit area, reflecting the intensity of light exposure and indicating the degree to which an object is illuminated. One lx corresponds to the luminous flux of a candle at a distance of 1 meter. The illuminance under the summer sun is approximately 100,000 lux, and the illuminance on an overcast day outdoors is about 10,000 lux.

In practical engineering applications, a dazzling effect caused by visible light radiation should also be considered. This involves calculating the retinal irradiance $E_r$ and determining whether a value of the retinal irradiance $E_r$ exceeds a minimum irradiance $E_{r,flash}$ that causes retinal afterimages and an irradiance threshold $E_{r,\,burn}$ that causes retinal burns. Respective calculation expressions are as follows:

$$E_r = E_c\left(\frac{d_p^2}{d_r^2}\right)\tau = E_c\left(\frac{d_p^2}{f^2\omega^2}\right)\tau; \qquad (23)$$

$$E_{r,flash} = \frac{3.59 \times 10^{-5}}{\omega^{1.77}}; \qquad (24)$$

$$E_{r,burn} = \begin{cases} 0.118/\omega, & \omega < 0.118 \text{ rad} \\ 1, & \omega \geq 0.118 \text{ rad} \end{cases}; \qquad (25)$$

where $E_c$ represents an irradiance at a plane in front of the observer's cornea (unit: W/m²), $d_p$ represents a pupil diameter, which is approximately 2 millimeters (mm) in daylight conditions, $d_r$ represents the diameter of the image projected onto the retina (assuming circular images), f represents the focal length of the eye, which is about 0.017 m, and ω represents an angular size of the glare source (subtended source angle), which can be calculated from the size of the glare source $d_s$ and radial distance r between the observer to the glare source, i.e., $\omega=d_s/r$. For example, the sun as a direct glare source has an angular size of: $1.392\times10^6/1.496\times10^8\approx0.0093$ rad. τ represents a transmission coefficient, which is generally about 0.5.

If multiple methods, including the above methods, are used for the glare evaluation, the design can consider results of the evaluation under the most unfavorable conditions.

For a road user (generally referring to the driver), the duration of the glare impact that the driver experiences is related to the driving speed. It is because as the driving speed increases, the view field of the driver narrows. Relevant research shows that as the driving speed increases from 70 kilometers per hour (km/h) to 100 km/h, the horizontal view field of the driver decreases from 60 degrees to 40 degrees, indicating that the reflected lights that may cause glare may not be perceived as the driving speed increases, but the increase in the driving speed makes it easier to cause traffic accidents.

Within a length of the road where the photovoltaic modules cause the glare, assuming the driving speed varies within a reasonable range, it is necessary to determine whether the indirect glare source produced by the photovoltaic modules will cause a stroboscopic effect of 2.5 Hz to 15 Hz for the driver.

The driving speed is denoted as v, and a distance between every two glare sources s=vf meet the following conditions: $s/v<f_{min}=2.5$ or $s/v>f_{max}=15$, i.e., when s<2.5 v or s>15 v, no stroboscopic effect occurs.

For example, when v=72 km/h, the distance between two glare sources should meet: s<50 m or s>300 m.

S500, for all the observation points on the observation paths, the steps S200-S400 are repeated to determine the static glare impact on roadside buildings, and an extent of the static glare impact is determined based on relevant glare calculation results. For the driver of a vehicle in motion, the dynamic view field that changes with the driving speed is considered, and whether the stroboscopic effect is produced is checked based on the distances between the photovoltaic modules. Installation locations or spacing that cause the glare hazards are adjusted.

A calculation example is as follows: A highway tunnel is located at 112.38 degrees cast longitude and 36.37 degrees north latitude. A photovoltaic array is installed in a green belt between left and right portals of the tunnel entrance and exit. A longitudinal spacing of the photovoltaic array is 10 m, and axes of the left and right portals are oriented 30 degrees north of west. It is assumed that photovoltaic modules of the photovoltaic array face due south with an installation tilt angle of 36 degrees. Taking a period from sunrise to sunset on Jul. 20, 2021, as an example, variations of an elevation angle of a reflected light from the photovoltaic array and the solar altitude angle, as well as an azimuth angle of the reflected light from the photovoltaic array, and the solar azimuth angle over time, are shown in FIG. 2 and FIG. 3.

Figure 3:
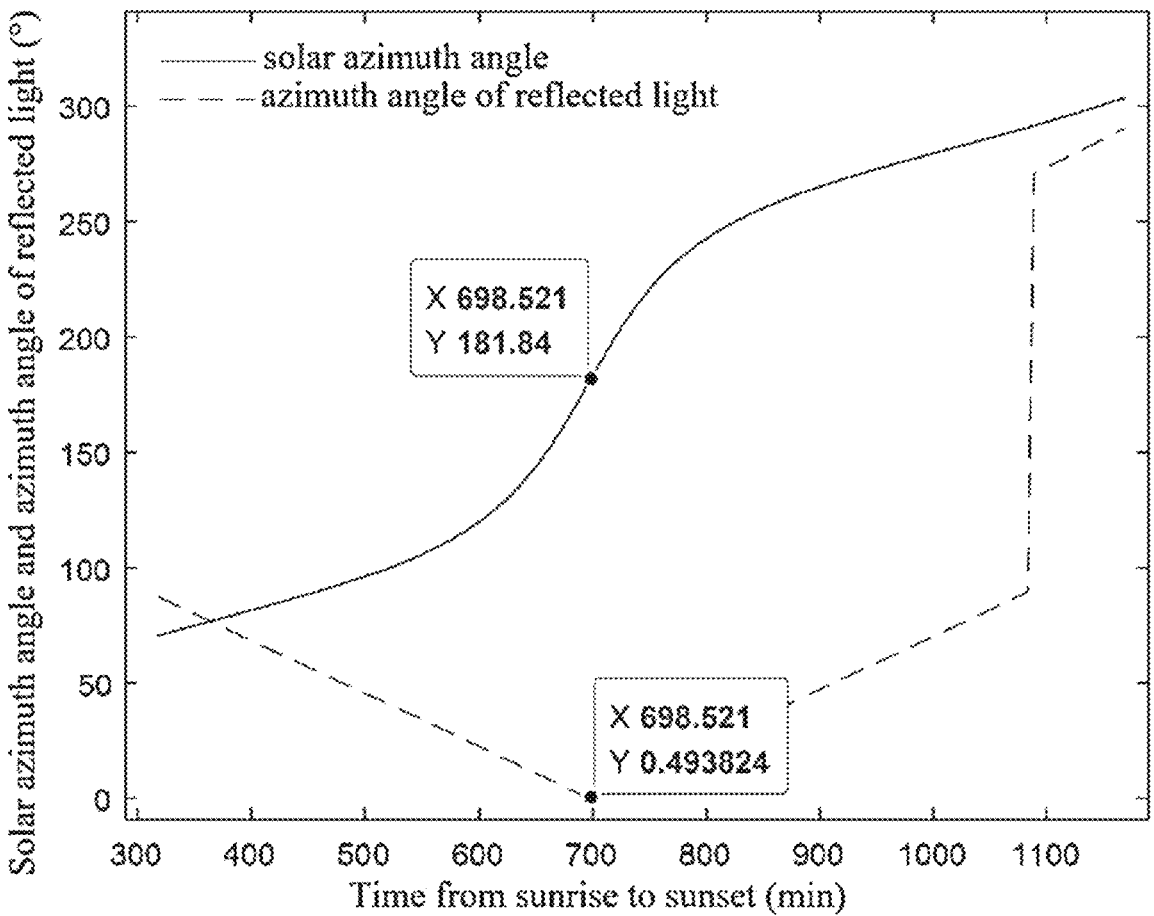
FIG. 3 illustrates a change trend diagram of a solar azimuth angle and an azimuth angle of the reflected light from the photovoltaic module during the period from sunrise to sunset.
Figure 4:
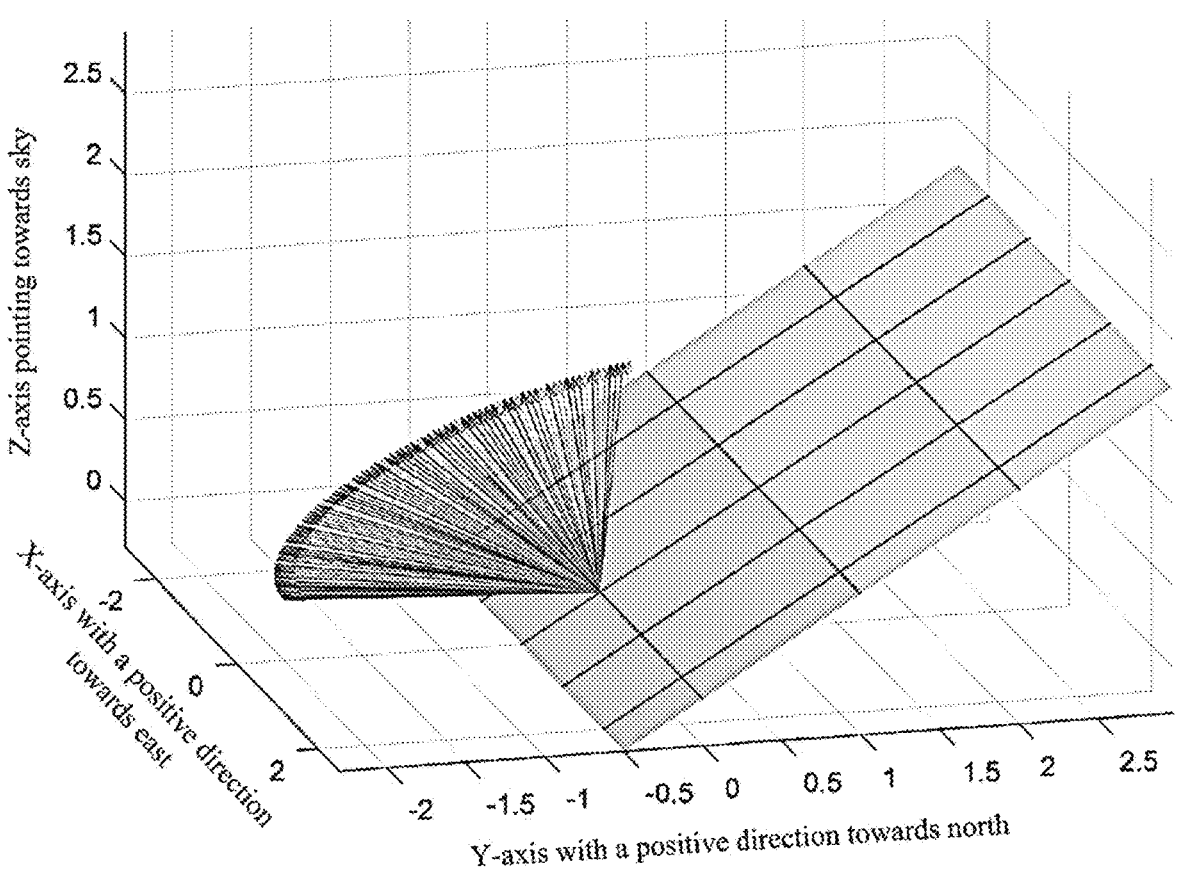
FIG. 4 illustrates a trajectory diagram of the reflected light on a panel surface of the photovoltaic module from sunrise to sunset.

To illustrate the meaning of the elevation angle of the reflected light, the close-to-noon time (the 698.521th minute, corresponding to 11:38 AM) in FIG. 2 is as an example. At this time, the solar azimuth angle is due south (consistent with the orientation of the photovoltaic modules), and an incidence angle between a solar ray and a plane of the photovoltaic modules is the smallest, approximately 51.5459 degrees. It is known that an installation tilt angle of each photovoltaic module is 36 degrees, it is apparent that an angle between the reflected light and the plane of the photovoltaic modules (also referred to as the complementary angle) is about 38.4541 degrees, and thus the angle between the reflected light and a horizontal plane is about 2.4541 degrees, which is very close to the 2.45566 degrees shown in FIG. 2. At this time, the reflected light is almost horizontal. The reflected light points from north to south, i.e., the azimuth angle is close to due north, corresponding to the azimuth angle in FIG. 3, which is about 0.49 degrees. To explain trajectory changes of the reflected light reflected by the photovoltaic array from sunrise to sunset, for case of understanding, a spatial geometric relationship of a plane where the photovoltaic array is located and the reflected light from sunrise to sunset is shown in FIG. 4.

The view field of the driver: upper and lower view fields of the vehicle are generally used to observe traffic lights above and obstacles and pedestrians on the road surface below in front of the vehicle during driving. Its size is measured by an angle of view field lines; the larger the angle, the broader the view field of the driver, and the better the vehicle's safety and comfort. Society of automotive engineers (SAE) regulations require the upper view field$\geq 7°$ and the lower view field$\geq 5°$. An eye point height is 1.2 m (taking a typical small car as an example). According to relevant studies, when the driving speed is 60 km/h, a horizontal view field range is 75 degrees.

With the above parameters, a spatial position relationship between the forward view field of the driver within a specified distance and the reflected light can be determined.

It is assumed the upper view field of the driver is not less than 10 degrees, the lower view field is not less than 20 degrees, and an object (traffic light) with a height of 5 m located 15 meters ahead can be seen at a minimum view field, with the eye point height of 1.2 m (taking a typical small car as an example), and the driving speed of 60 km/h, a part of the view field blocked by a left A-pillar of a left-hand drive car is not considered, a dynamic view field of the driver (dynamic field of view refers to a spatial range that can be seen without moving the head and eyes) can be simplified as: a horizontal view field range is 75 degrees, a vertical view field range is 50 degrees, the upper view field is 30 degrees, the lower view field is 20 degrees, and a direction of the driving lane is 30 degrees north of west. Apparently, at this time, the reflected lights overlap with the view field range of the driver, causing the glare. According to the analysis of flicker herein, under normal driving speed, the normal installation spacing of roadside photovoltaics will not produce flicker glare.

Assuming it is 11:38 AM, the illuminance $E_r$ of the photovoltaic modules (the glare source) on the eyes is 60,000 lx, and the distance L from the driver to the glare source is 10 m. Using the "psychological glare degree index" (G value) for evaluation, at this time G is approximately 2.278, causing uncomfortable psychological glare.

Assuming the irradiance $E_c$ in front of the observer's cornea is 0.1 watts per square centimeter (W/cm²)=1000 W/m², i.e., $\omega = d_s/r$. The angular size $\omega$ of the glare source is approximately 0.0093 rad. The transmission coefficient $\tau$ is approximately 0.5, the focal length of the human eyes f is approximately 0.017 m, and the pupil diameter $d_p$ is approximately 0.002 m. The retinal irradiance $E_r$ is approximately 8 W/cm², and the irradiance threshold $E_{r, burn}$ that causes retinal burn is approximately 12.69 W/cm². The minimum irradiance ($E_{r, flash}$) that causes an afterimage on the retina is approximately 0.14 W/cm². If $E_c$ exceeds 0.14 W/cm², an afterimage will be produced on the retina. If $E_c$ is close to 0.15 W/cm², the retina will be at risk of burn. In practice, illuminance can be measured with a lux meter, and irradiance can be measured with an instrument, or if a precision requirement is not high, the variability of solar radiation can be disregarded, and theoretical formulas or empirical formulas can be used for calculation, or the empirical relationship (generally linear correlation) between the illuminance and the irradiance can be used to determine it.

In the above glare analysis calculations, the illuminance is required, which can be measured using a lux meter. When calculating the extent of the indirect glare impact on the retina, the irradiance is needed and can be measured with an instrument, or the following formula can be used for calculation without considering the variability of solar irradiance.

$$E = 1.04 \times 10^{-2} L \qquad (26);$$

where E represents the irradiance and L represents the illuminance.

By definition, the illuminance L can be expressed by the following formula:

$$L_v = K_m \int L_e(\lambda) V(\lambda) d\lambda \qquad (27);$$

where $K(\lambda)$ represents the number of lumens of luminous flux that can be produced per watt of radiant flux at a given wavelength. The human eyes have different sensitivities to different wavelengths of light, and in the visible spectrum, $K(\lambda)$ reaches its maximum value at $\lambda = 555$ nanometers (nm), denoted as $K_m$, and $K_m = 6831$ lumens per watt (lm/W) or 6831 lux per watt per square meter (lx/Wm⁻²). $V(\lambda)$ represents a spectral luminous efficiency function of the CIE standard photopic observer, $L_e(\lambda)$ represents spectral irradiance of a light source to be tested at the wavelength $\lambda$, with a unit of watts per square meter per nanometer (W/m²·nm).

The irradiance $E_e$ can be obtained by integrating $L_e(\lambda)$, as shown in an equation (28):

$$E_e = \int L_e(\lambda) d\lambda \qquad (28);$$

By using the conversion factor T, in an equation (29), the irradiance can be obtained from the illuminance. In practical applications, the conversion factor T can be calculated by measuring the relative spectral irradiance of the light source in a visible region with a spectroradiometer.

$$T = \frac{E_e}{L_v} = \frac{\int L_e(\lambda) d\lambda}{K_m \int L_e(\lambda) V(\lambda) d\lambda}; \qquad (29)$$

The above embodiments demonstrate and describe the basic principles and main features of the disclosure. Those skilled in the art should understand that the disclosure is not limited by the above embodiments.

Although the embodiments of the disclosure have been disclosed above, they are not limited to the applications listed in the specification and embodiments, and can be fully applied to various fields suitable for the disclosure. For those skilled in the art, modifications for other purposes can be easily implemented. Therefore, without violating the general concept of the claims and equivalent scope limitations, the disclosure is not limited to specific details and the illustrations given herein.

What is claimed is:

1. A roadside photovoltaic site installation method considering a glare impact, comprising:

S1, obtaining latitudes, longitudes, ground elevations, and contour vertex heights of photovoltaic modules above ground at a proposed installation location of a photovoltaic array, and collecting nearby solar radiation observation data;

S2, calculating a sun movement path comprising a solar altitude angle and a solar azimuth angle, and determining an installation manner of the photovoltaic array at the proposed installation location based on predicted solar radiation on inclined surfaces of the photovoltaic array at the proposed installation location, wherein the installation manner comprises an optimal tilt angle and an optimal azimuth angle for a fixed arrangement;

S3, calculating an elevation angle and an azimuth angle of each of reflected lights caused by the inclined surfaces based on sun positions at different seasons and times and inclined surface angle information of the photovoltaic modules of the photovoltaic array;

S4, determining an affected road length range based on a spatial geometric relationship between the reflected lights and adjacent roads of the photovoltaic array, determining observation paths along a road centerline facing the reflected lights, arranging observation points at predetermined intervals, and conducting a glare impact analysis for each of the observation points;

S5, determining whether to adjust an installation tilt angle of each of the photovoltaic modules or distances between adjacent photovoltaic modules based on results of the glare impact analysis for each of the observation points, and finding a critical tilt angle of each of the photovoltaic modules, wherein the critical tilt angle of each of the photovoltaic modules does not produce glare hazards, wherein the results of the glare impact analysis comprise: static glare impact grading and duration, and whether a flicker effect occurs;

S6, comparing solar radiation received on an inclined surface of each of the photovoltaic modules at the critical tilt angle and the optimal tilt angle; in response to a difference in the solar radiation less than a set value, accepting the critical tilt angle as the installation tilt angle, and in response to the difference in the solar radiation greater than or equal to the set value, taking measures to eliminate the glare impact, or marking a corresponding installation location as unsuitable; and S7, completing the glare impact analysis and an evaluation for all the observation points along each of the observation paths, and providing recommended installation locations, wherein the recommended installation locations do not produce the glare hazards, and installing the photovoltaic modules at the recommended installation locations;

wherein at the step S3:

a bracket tilt angle on a curved road section is equal to a monthly optimal tilt angle $\beta_{opt}$ of each of the photovoltaic modules, an azimuth angle $\Phi$ of each of the photovoltaic modules is equal to a bracket azimuth angle and consistent with an azimuth angle of a slope surface or the road centerline of the curved road section, the solar altitude angle is denoted as $\alpha$, the solar azimuth angle is denoted as $\theta$, the installation tilt angle of each of the photovoltaic modules is denoted as $\beta$, and an azimuth angle of each of the photovoltaic modules is denoted as $\Phi$, and a direction unit vector of each of the reflected lights is $\vec{q}=[q_x, q_y, q_z]^T$, calculated according to an equation (15):

$$\vec{q}=M^T\times\vec{b} \tag{15};$$

$M^T$ represents a transpose matrix of a matrix M, and expressions for the matrix M and a vector $\vec{b}$ are as follows:

$$M = \begin{bmatrix} 0 & -n_z & n_y \\ n_z & 0 & -n_x \\ -n_y & n_x & 0 \\ n_x & n_y & z \end{bmatrix};$$

-continued
$$\vec{b} = \begin{bmatrix} -n_zk_y + n_yk_z \\ n_zk_x - n_xk_z \\ -n_yk_x + n_xk_y \\ -(n_xk_x + n_yk_y + n_zk_z) \end{bmatrix};$$

$\vec{n}=[n_x, n_y, n_z]$ represents an outward normal unit vector of the inclined surface of each of the photovoltaic modules, $\vec{k}=[k_x, k_y, k_z]$ represents a direction unit vector of an incident light, and component expressions of $\vec{n}$ and $\vec{k}$ are as follows:

$n_x=\sin \beta \sin \Phi$;

$n_y=\sin \beta \cos \Phi$;

$n_z=\cos \beta$;

$k_x=\cos(-\alpha)\cos(270°-\theta)$;

$k_y=\cos(-\alpha)\sin(270°-\theta)$;

$k_z=\sin(-\alpha)$;

after obtaining the direction unit vector of each of the reflected lights $\vec{q}=[q_x, q_y, q_z]^T$, the elevation angle $\eta$ and the azimuth angle $\psi$ of each of the reflected lights are obtained by converting the direction unit vector of each of the reflected lights from a Cartesian vector to horizontal coordinates, as follows:

$$\eta=\arcsin(q_z) \tag{16};$$

$$\psi = \arctan\left(\frac{q_x}{q_y}\right); \tag{17}$$

an impact range of the reflected lights is determined after calculating directions of the reflected lights.

2. The roadside photovoltaic site installation method according to claim 1, wherein the observation paths comprise a road or a building group in a roadside service area, wherein the photovoltaic array is allowed for being observed in a travel direction on the road.

3. The roadside photovoltaic site installation method according to claim 1, wherein the observation points are set along a road travel direction, with a view height of 1.2 meters (m) or 2.4 m; when the photovoltaic array is allowed for being observed on a point within a view field of a driver, the point is marked as an observation point and numbered, and when the photovoltaic array is not visible on the point within the view field of the driver due to an obstruction by obstacles, there is no need to set the observation point.

4. The roadside photovoltaic site installation method according to claim 1, wherein in response to the fixed arrangement as the installation manner of the photovoltaic array, the optimal tilt angle and the optimal azimuth angle are calculated based on monthly average irradiance, direct component irradiance and diffuse component irradiance, and the optimal tilt angle and the optimal azimuth angle comprise: an annual optimal tilt angle and an annual optimal azimuth angle, a quarterly optimal tilt angle and a quarterly optimal azimuth angle, and the monthly optimal tilt angle and a monthly optimal azimuth angle;

in response to a grid-connected photovoltaic power generation system, the optimal tilt angle maximizes annual radiation on the inclined surfaces of the photovoltaic array, and in response to a stand-alone photovoltaic power generation system, the optimal tilt angle ensures a radiation on the inclined surfaces of the photovoltaic array during a month with lowest irradiance; and the elevation angle and the azimuth angle of each of the reflected lights at different months and times are calculated based on the optimal tilt angle and the optimal azimuth angle.

\* \* \* \* \*